May 24, 1966   R. B. ROBBINS   3,253,121
WELDING METHOD

Filed July 6, 1965   2 Sheets-Sheet 1

WITNESSES.   INVENTOR.
Robert B. Robbins
by Curtis, Morris & Safford
Attorneys

United States Patent Office 3,253,121
Patented May 24, 1966

3,253,121
WELDING METHOD
Robert B. Robbins, 51 Beechdale Road,
Dobbs Ferry, N.Y.
Filed July 6, 1965, Ser. No. 477,337
8 Claims. (Cl. 219—137)

This application is a continuation-in-part of my allowed application Serial No. 285,308, filed June 4, 1963, which in turn was a continuation-in-part of my application Serial No. 234,111, filed October 30, 1962, both now abandoned.

This invention relates to a new method of welding, which is applicable to all types of welding of both ferrous and non-ferrous metals, and which provides a practical and reliable means for welding plate and/or structural members with sheared, burned, milled or rolled edges as supplied from the mills. It thus entirely eliminates the costly edge preparation heretofore required.

In general terms, this new method of welding involves spacing the members to be welded slightly apart and placing beneath them a back-up member (for example, a copper bar which may be liquid cooled) which supports metallic particles whose size may vary from as large as shot to as fine as powder, and which partially or fully fill the gap between the edges. In the welding of thicker plates, the edges may desirably be spaced sufficiently to allow the welding electrodes or wire to pass between them. The weld is completed by making one welding pass from one side of the welding joint for plate and structural members up to 2" or more in thickness, or by making one welding pass on each side of the welding joint for plate and structural members up to 4" or more in thickness.

The metallic particles, which may or may not be mixed with other organic or inorganic materials as required for a particular welding application, function as a shield and support for the welding arc or flame and the molten weld metal puddle, as well as providing a source of weld metal and a medium for controlled dissipation of the welding heat. The metallic particles may vary in size and metallurgical composition as required to be compatible with the parent metals being welded and/or to achieve any alloying desired. If larger particles such as steel shot are used, only a small quantity of the particles is consumed in making up the weld, thereby becoming a part of the weld metal. If smaller particles, such as iron powder, are used, larger quantities of the powder are fused, even up to the point where the powder is fully fused, forming as much as 50% or more of the weld metal.

In the drawing:
FIGURE 1 is a cross sectional view of two thick plates laid edge-to-edge upon a back-up bar, and with the space between the plate edges full of metallic shot, powder, or other particles, and illustrates the first step in a process of welding together said plates according to one version of my invention.

Figure 1:
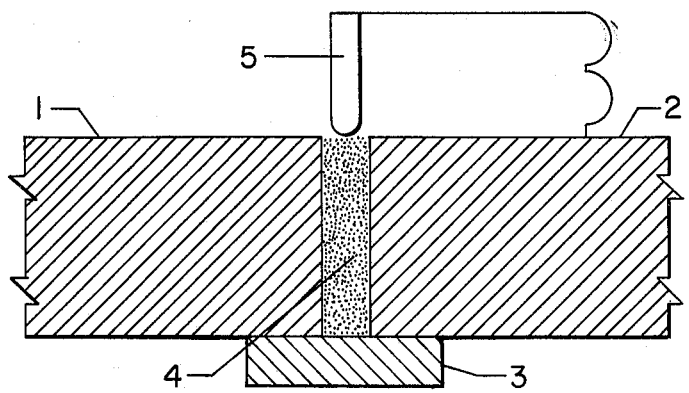
Figure 2:
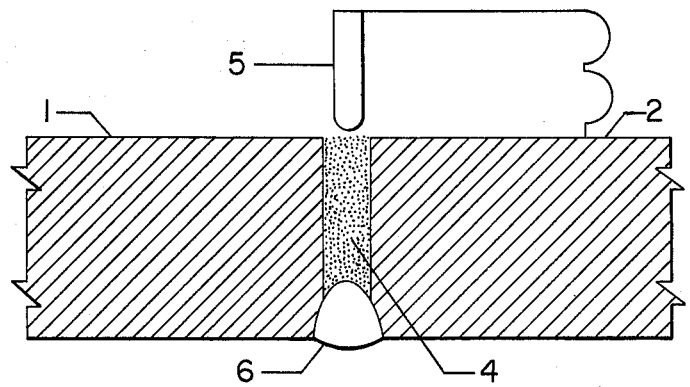
FIGURE 2 shows the second step of the process illustrated in FIGURE 1, with the same plates turned over, and ready for completion of the weld.

In the drawings, where like reference characters denote corresponding parts, the reference numerals 1 and 2 designate the end sections of a pair of thick plates which are to be welded together. As seen, the edges of the plates 1 and 2 are spaced apart slightly and are backed up by a back-up bar 3 which supports a charge of metallic particles 4 which fills the welding space between the edges. In the first welding pass, the metallic particles nearest the electrode 5 are partially fused to form a welding bead 6 (FIGURE 2). After this first pass has been completed, the plates are turned over as shown in FIGURE 2 and any unfused metallic particles 4 which spill out may be replaced, then a second welding pass is made, fusing any added particles, with fusion of the welding electrode 5 supplying sufficient additional metal to fill the entire space between the edges of the plates. Thus, a substantial fraction (15% or more) of the weld metal is contributed by the fused particles, which shrink in volume up to about 50% in fusion, while the balance is supplied by the electrode 5. Although the weld bead 6 formed on the first pass is illustratively shown in FIGURE 2 as extending substantially less than half-way through the depth of the weld space, it may extend more than half-way through depending, for example, upon the welding current and the speed of movement of the electrode during the first pass.

Figure 3:
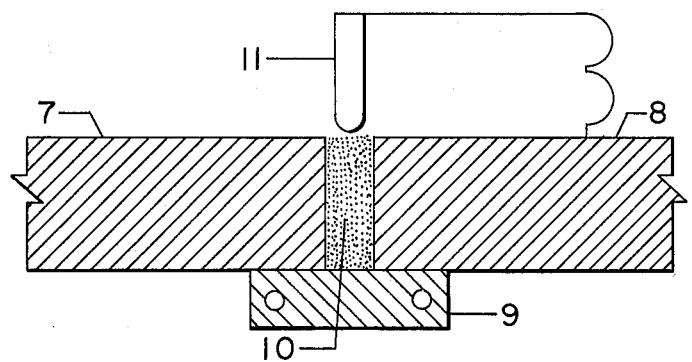
FIGURE 3 is a similar view, illustrating a modified process for welding together thinner plates that require only one welding pass.

A modified process is shown in FIGURE 3, which may be used for thinner plates, where it is desired to weld the plates in a single pass. In this variation, the plates 7 and 8 are backed up by a liquid-cooled back-up bar 9, and the space between the plate edges is entirely filled with metallic powder 10. Only one pass is made with the electrode 11, fusing the powder 10 to the full depth of the joint. Approximately one-half of the weld metal is provided by fusion of the powder 10, with the balance being supplied by the electrode 11.

Figure 4:
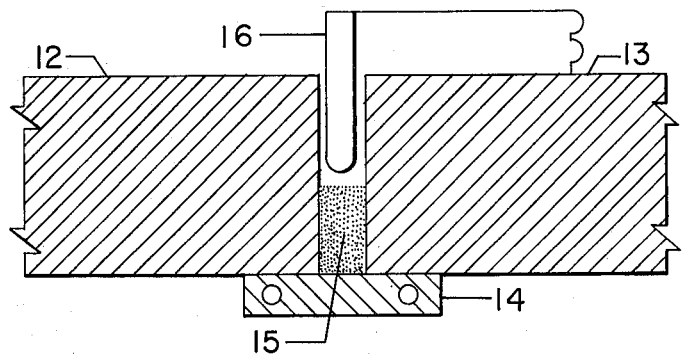
FIGURE 4 is a similar view, illustrating an alternative version of the process, as used for welding together thicker plates.

FIGURE 4 shows a variation of the method as used for welding thicker plates in a single pass. The edges of the plates 12 and 13 are spaced apart sufficiently to permit the welding electrode 16 to be introduced between them. The space between the plate edges and above the back-up bar 14 is approximately one-half filled with metallic powder 15. The plates may be welded together in a single pass, with a substantial fraction (approximately fifteen percent or more) of the weld metal being provided by fusion of the powder 15, and the remainder being supplied by the electrode 16.

Figure 5:
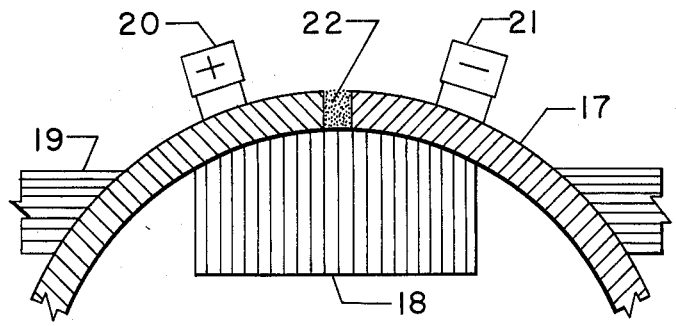
FIGURE 5 is a fragmentary cross-sectional view through a pipe being welded by another variation of the process.

FIGURE 5 illustrates the flash welding of a pipe 17. A back-up bar 18 is positioned against the inner wall of the pipe, beneath its adjacent edges (which are pressed together by vise jaws 19). The space between the edges and above the back-up bar 18 is completely filled with metallic powder 22. Brushes 20 and 21 respectively make electrical contact with the pipe adjacent to and at opposite sides of the edges to cause flash welding of the seam by complete fusion of the powder 22.

Figure 6:
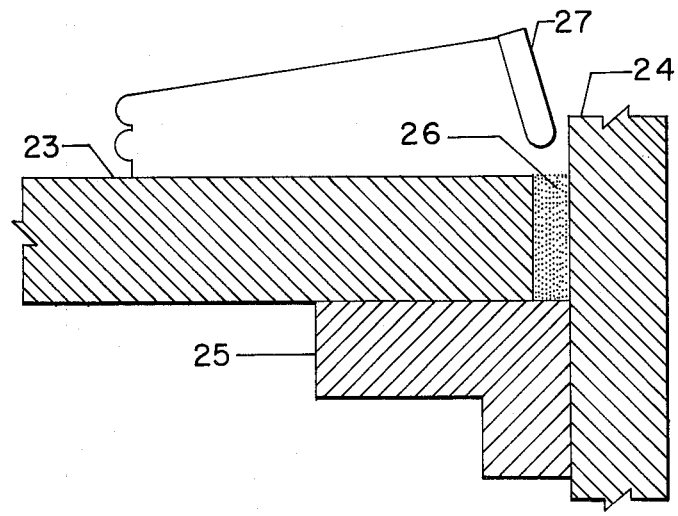
FIGURE 6 is a cross-sectional view of two plates being welded perpendicularly to one another according to still another version of the process.

FIGURE 6 illustrates the use of another version of the method for welding together two plates 23 and 24 arranged perpendicularly to one another. A back-up bar 25 (illustratively shown as L-shaped) is positioned beneath the joint, and the welding space above it completely filled with metallic powder 26. The powder 26 is completely fused in a single pass of the welding electrode 27.

In all of the foregoing illustrations, the metallic particles are melted and fused into the weld metal by heat energies which were formerly wasted and dissipated into the materials being welded, which was structurally detrimental to the welded joint and caused distortion. By utilizing this formerly wasted energy, and by reducing the cross sectional area of the weld, it is possible to weld thick plates with a fraction of the weld metal formerly required from the electrode source, thus permitting consistent quality welded joints to be made at speeds heretofore impossible.

The metallic powders may be of an extremely fine particle size, permitting fusion at low heat energy inputs. Various chemical and physical properties of the weld metal may be easily and economically obtained by proper mixtures of ingredients. Where metallic powders are used, they may be agglomerated with alloying ingredients to insure uniform weld quality throughout the welded joint. The present method permits increased welding efficiencies in all arc welding processes such as submerged arc, metal inert gas, tungsten inert gas, micro-wire, electro-slag, electro-gas, etc.; in resistance welding processes, flash and beam welding; in high frequency welding, ultrasonic welding and percussion welding; and in gas welding processes such as oxy-acetylene, oxy-hydrogen, pressure gas and plasma arc welding.

One of the greatest advantages afforded by this process is the ability to weld metallic materials such as plates and structural or other shapes as they are finished at the mill, with their edges either rolled, sheared or burned. By eliminating special edge preparation, considerable savings in the cost of fabrication are made possible by this process. For example, the process eliminates the necessity of providing excess material, which was heretofore removed in preparing the edges for welding. It also eliminates the cost of machining or burning the special edges, for example chamfered edges formerly required for welding, as well as the handling of the materials to and from the machines performing the edge preparation. It also greatly simplifies the fit-up procedures. Plates received from a steel mill may now be made ready for welding merely by fitting these plates together with a space of preferably approximately ¼" or less but acceptable up to approximately 1" between their edges for the insertion of metallic particles, with back-up plates or bars to support the particles. The welding arc melts the metallic powders and filler wire creating a weld in which the metallic powders may be contributing as much as 50% or more of the weld metal.

The metallic particles thus serve the important function of bridging the variable openings that exist between two plates and/or structurals when they are fitted together for welding. These openings are particularly noticeable and troublesome in making long welded joints. It is most difficult to burn, shear, or machine the edges absolutely straight because of the mechanical tolerances of the machines used, because of the heat that is transferred into the plate by the cutting action which, in turn, causes the plate to expand during cutting, and because of the human element in the operation of the equipment. Since the metallic particles completely bridge whatever variable gap or opening exists between the members being welded, a perfect fit-up, allowing optimum welding conditions, is assured.

The use of the metallic particles permits practical opportunities for the use of certain welding processes in welding applications where heretofore they were considered impractical or of limited efficacy. One example of this is in the use of flash welding, as illustrated in FIGURE 6, for the fabrication of large diameter piping, where the irregularity of fit-up prevents uniform arc transfer between the plate edges, resulting in improper fusion. By the use of the present welding process, this irregularity of fit-up may be overcome by the fine particles which are inserted between the plate edges to insure uniformity of contact and arc transfer between them. The iron powders may be inserted into the welding space by various mechanical and manual means. For example, the iron powders, with or without various alloying ingredients, may be contained in tubular welding wires, permitting all-position welding with greater welding efficiencies as well as enabling the provision of any desired alloying elements in the weld metal.

Plug welding of holes or slots in plates or structurals is also made easier and faster by using the present process, by permitting welding across the opening, rather than requiring the usual using stitching techniques. Also, the welding output is further enhanced by consumption of some or all of the metallic particles to form weld metal.

Welding from one or both sides of plates or structurals can be made extremely simple, with the current and voltage settings fixed, and with the welding speed being the only variable for different thicknesses of plates and structurals. The currents and voltage can be set sufficiently high to obtain current densities in the order of 65,000 to 100,000 amps per square inch on the welding wire, thus permitting high efficiencies and deep penetrations of the welds into the body of metallic particles, although lesser currents and voltages can be used successfully. The welding speed will vary according to the thickness of plate and the gap between the plate edges.

The gap may be either partially or completely filled with metallic particles, depending on the type of metallic particles used and upon the thickness of materials being welded. As an example, in welding with a current density of 70,000 amps per square inch and 35 volts, using fine-sized iron powder as the back-up material, the powder may be fused to a depth of one inch. Higher current densities and higher voltages will afford even greater penetration of fine-sized powders. In the use of coarser metallic particles, the penetration is considerably less. Weld penetration is thus a function of the heat input in joules per inch, the welding voltage, the plate opening and the particle size.

Due to the high welding currents used, the grounding and the fitting of the back-up bar to the pieces being welded must be arranged to provide electrical uniformity in order to achieve consistently good results. The impedance for A.C. welding current or the resistance for D.C. welding current should be kept as low and as uniform as possible along the welded joint. This can be done in several ways, one being to use a copper back-up bar that is connected at both ends to the return welding ground. The welding tacks hold the members being welded in relative alignment and help to maintain equal potentials between them. The back-up bar ideally should be in contact with the members being welded along the full length the joint to insure good grounding contact and also to prevent the metallic particles from falling out or from being blown out by the welding arc.

Many welding tests had been made using the metallic particle welding process in various plants and welding laboratories in different sections of the United States and, following only the simplest of directions, all persons using this welding process have been able to make sound welds. However, the following discussion and examples will give a more specific idea concerning typical welding conditions.

METALLIC PARTICLE SIZE

The metallic particles may vary in size depending upon the particular welding conditions at hand. Coarser materials offer advantages where the back-up fit is poor and/or where the amount of the metallic particles to be melted and become part of the weld metal is to be limited. Finer materials offer advantages where the back-up fit is good and/or where it is desirable that a large part or all of the metallic particles are to be melted and become part of the weld metal. The metallic particles may vary in size from shot approximately ⅛" in diameter to fine powders that will pass through 200 mesh screen, referring to the Tyler standard mesh per linear inch.

Fine powders may be agglomerated to form larger particles and those conglomerates may contain powders of different alloying metals.

Where powder is used, a mixture of particle sizes appears desirable to achieve best welding results. Particle sizes of a typical iron powder mixture for large plates as used in a shipyard would be as follows:

SCREEN ANALYSIS, PERCENT CUMULATIVE

| | |
|---|---|
| +8 mesh | 5% maximum. |
| +12 mesh | 10–30. |
| +20 mesh | 40 minimum. |
| 32 mesh | 50–80. |
| 65 mesh | 75–95. |
| 100 mesh | 95 minimum. |
| −100 mesh | 5 maximum. |

COMPOSITION OF METALLIC PARTICLES

There are several types of metallic particles that can be successfully used and the choice of type of metallic particles is dependent on economics and the welding conditions at hand. Some of the types of materials that can be used in welding mild steels are steel shot, iron powders, nail whiskers, iron and steel filings, and cut wire segments.

A typical composition of metallic particles suitable for welding mild steel could have the following analysis: 98% Fe, 0.06% C, 0.35% Mn, 0.25% Si, 0.02% S, and 0.02% P. This composition can vary somewhat without being detrimental to the weld; however, the above mixture will give welds of excellent physical and chemical qualities.

Alloy steels may require any of the component materials employed for welding mild steel together with powders or particles of nickel, chromium, and other materials to be compatible with the particular alloy steels being welded.

Aluminum and other metals may be welded using cut wire segments, powders, or filings of the material being welded.

It may be found desirable to mix the types and chemical composition of the metallic particles to achieve a particular welding result.

The following represent typical sets of welding conditions:

*Example No. 1*

Two-inch thick plates were welded together by spacing the plates aproximately ½″ apart and, after tacking the plates together for proper alignment, the ½″ space between plates was one-half filled with low carbon steel shot. The plates had squared edges and were positioned for a butt weld. The 2″ plates were in a horizontal position for a down-hand weld and were resting on a plate that was placed beneath their edges and grounded to the return welding ground. A tandem submerged arc welding machine using a D.C. lead arc and an A.C. trail arc was used, being set at 900 amps and 37 volts for the lead arc, and 600 amps and 40 volts for the trail arc, with welding speeds set at 15 i.p.m. Lincoln 760 flux and ³⁄₁₆ and ⅛″ dia. Raco Hi-Mang wire were used. The weld on the top side was made in one pass. Thereupon, the plates were turned over, spilling the unfused shot, but without cleaning out the fused flux with steel shot impregnation. The second side was welded in one pass, using the same current, voltage and welding speed settings as on the first side. The finished weld passed X-ray examination.

The welding samples passed all the physical acceptance tests with the following results:

| | |
|---|---|
| Yield | p.s.i. 43,500 |
| Tensile | p.s.i. 67,750 |
| Elongation | percent 28 |

All bend tests passed.

Chemical analysis of the finished weld showed only 0.13% C, 0.35% Mn, 0.25% Si, 0.02% S, 0.02% P, and 98% Fe.

*Example No. 2*

In this welding test, iron powder was used in welding two 1½″ thick plates together with all the welding done from one side in one pass using a single wire submerged arc welding machine. ⁵⁄₃₂″ dia. Oxweld 36 wire and Linde No. 60 flux were used. The two 1½″ thick plates with square edges were spaced ⁵⁄₁₆″ apart and positioned in the horizontal plane for a down-hand weld with the ⁵⁄₁₆″ opening placed over a 1″ x 4″ water-cooled copper back-up bar which, in turn, was connected to the return welding ground. The plates were tacked together for proper alignment and the ⁵⁄₁₆″ opening between the two 1½″ plates was half-filled with iron powder having a chemical analysis of 98% Fe, 0.06% C, 0.35% Mn, 0.25% Si, 0.02% C, and 0.02% P, with particles sizes as follows:

SCREEN ANALYSIS, PERCENT CUMULATIVE

| | Percent |
|---|---|
| +32 mesh | 27.4 |
| +65 mesh | 78.8 |
| +100 mesh | 98.3 |
| −100 mesh | 1.7 |

The welding machine was set at 1050 amps, 37 volts, travel speed 5 i.p.m. The weld was made in one pass from one side only with 100% penetration. The entire length of weld proved 100% sound upon X-ray examination.

Physical tests of the weld gave the following results:

| | |
|---|---|
| Yield | p.s.i. 42,000 |
| Tensile | p.s.i. 65,000 |
| Elongation | percent 32½ |

All bend tests passed.

Chemical analysis of weld metal showed 0.08% C, 0.36% Mn, 0.25% Si, 0.02% S, 0.02% P, and 98.27% Fe.

Among the advantages of this method over conventional welding methods are the following:

(1) It is less critical as to fit-up tolerances than present welding methods, and entirely eliminates the costly edge preparation of the materials to be welded which is now required. This eliminates wastage of material and saves substantially on labor and machine utilization.

(2) It provides consistent quality welds which will satisfy the most critical inspection by X-ray and other methods.

(3) It permits performance of the various welding processes, including automatic or machine welding processes, at much greater speeds than heretofore possible.

(4) It is less sensitive to rust and moisture than previous methods.

(5) In the welding of heavier plates and structural sections, it requires considerably less weld metal to be deposited than was required with the joint designs heretofore used. It thus effects a substantial saving of weld wire.

(6) It makes possible considerable savings in electrical current.

I do not desire to be understood as limiting my invention to the specific details herein described and illustrated, as it is manifest that variations and modifications may be made in the specific illustrative arrangements and steps disclosed, without departing from the spirit of my invention. I therefore reserve the right to all such conditions and modifications that properly fall within the scope of my invention as defined by the appended claims.

I claim:

1. The method of welding together two metallic members without the necessity of beveling or other edge preparation which comprises arranging said members with a possibly irregular, generally horizontal welding space of not greater than approximately 1″ between them, placing a back-up member beneath said welding space, filling said welding space between said metallic members and on top of said back-up member at least partially full of metallic particles having the same principal ingredient as said metallic members, and applying to said metallic particles and the portions of said metallic members adjacent said welding space sufficient heat to cause fusion of at least a portion of said metallic particles with said metallic members, and thereby substantially fill said welding space with metal of which a substantial fraction is contributed by fusion of said metallic particles.

2. The method as recited in claim 1 in which said metallic members are made of steel and said metallic particles comprise iron powder with alloying ingredients similar to those contained in said steel.

3. The method as recited in claim 1 in which said metallic particles consist principally of fine-sized iron powders, and said back-up member consists of an internally liquid-cooled metal bar.

4. The method of welding together two metallic members without the necessity of beveling or other edge preparation which comprises arranging said members with a possibly irregular, generally horizontal welding space of not greater than approximately ½" between them, placing a metallic back-up member beneath said welding space, completely filling said welding space between said metallic members and on top of said back-up member with a metallic powder having the same principal ingredient as said metallic members, moving a welding electrode along the upper surface of the filled welding space, and applying an electrical voltage between said welding electrode and said metallic members to cause an arc of sufficient current to produce fusion of said metallic powder with the adjacent portions of said metallic members to fill a substantial fraction of said welding space with metal produced by fusion of said metallic powder and to cause melting of said welding electrode to the extent that enough additional weld metal is deposited from said welding electrode to fill any remainder of said welding space and become fused with the adjacent portions of the metallic members and the fused powder.

5. The method of welding together two metallic members without the necessity of beveling or other edge preparation which comprises aranging said members with a possibly irregular, generally horizontal welding space between them which is large enough to admit the end of a welding wire, but not substantially greater than 1", placing a metallic back-up member beneath said welding space, partially filling said welding space with metallic powder having the same principal ingredient as said metallic members, inserting a welding wire into the portion of said welding space above said metallic powder, and applying an electrical voltage between said welding wire and said metallic members to cause an arc of sufficient current to produce fusion of substantially all of said metallic powder with the adjacent portions of said metallic members to fill a substantial fraction of said welding space with metal produced by fusion of said metallic powder and to cause melting of said welding wire to the extent that enough additional weld metal is deposited from said welding wire to fill the remainder of said welding space and become fused with the adjacent portions of the metallic members and the fused powder.

6. The method of welding together two metallic members without the necessity of beveling or other edge preparation which comprises arranging said members with a possibly irregular, generally horizontal welding space of not greater than approximately ½" between them, placing a back-up member beneath said welding space, completely filling said welding space between said metallic members and on top of said backup member with metallic powder having the same principal ingredient as said metallic members, applying to said metallic powder and the portions of said metallic members adjacent said welding space sufficient heat to cause fusion of at least the upper portion of metallic powder with said metallic members, to form a welding bead at the upper portion of said welding space, turning said members over, at least partially filling the welding space above said welding bead with metallic powders having the same principal ingredient as said metallic members, and applying to said metallic particles and the portions of said metallic members adjacent said welding space sufficient heat to cause fusion of all of said metallic powders with the adjacent portions of said metallic members and thereby fill said welding space with metal of which a substantial fraction is contributed by said metallic powder.

7. The method of welding together two metallic members without the necessity of beveling or other edge preparation which comprises arranging said members with a possibly irregular, generally horizontal welding space of not greater than approximately ½" between them, placing a back-up member beneath said welding space, completely filling said welding space between said metallic members and on top of said back-up member with metallic powder having the same principal ingredient as said metallic members, moving a welding electrode along the upper surface of the filled welding space, applying an electrical voltage between said welding electrode and said metallic members to cause an arc of sufficient current to produce fusion of at least a portion of said metallic powder with the adjacent portions of said metallic members, to form a welding bead at the upper portion of said welding space, turning said members over, at least partially filling the welding space above said welding bead with metallic powders having the same principal ingredient as said metallic members, moving a welding electrode along the upper surface of the filled welding space, and applying an electrical voltage between said welding electrode and said metallic members to cause an arc of sufficient current to produce fusion of substantially all of said metallic powder with the adjacent portions of said metallic members to fill a substantial fraction of said welding space with metal produced by fusion of said metallic powder and to cause melting of said welding electrode to the extent that enough additional weld metal is deposited from said welding electrode to fill the remainder of said welding space and become fused with the adjacent portions of the metallic members and the fused powder.

8. The method of flash welding together two metallic members without the necessity of beveling or other edge preparation which comprises arranging said members with a possibly irregular welding space of not greater than approximately ½" between them, placing a back-up member beneath said welding space, partially filling said welding space with metallic powder having the same principal ingredient as said metallic members, contacting said members adjacent to and at opposite sides of said welding space with a pair of electrodes, and applying to said electrodes an electrical voltage to cause sufficient current to flash across said welding space to produce fusion of substantially all of said powder with the adjacent portions of said metallic members and thereby substantially fill said welding space with metal of which a major fraction is contributed by said metallic powder.

References Cited by the Examiner

UNITED STATES PATENTS

| | | | |
|---|---|---|---|
| 379,453 | 3/1888 | De Bernardos | 219—137 |
| 1,323,556 | 12/1919 | Smith | 219—160 |
| 1,674,109 | 6/1928 | Grob | 219—67 |
| 1,872,287 | 8/1932 | Heineman | 219—67 |
| 2,122,994 | 7/1938 | Smithgate | 219—137 |
| 2,331,689 | 10/1943 | Hodge | 219—160 X |
| 2,927,990 | 3/1960 | Johnson | 219—73 |

RICHARD M. WOOD, *Primary Examiner.*